United States Patent [19]
Heffley

[11] Patent Number: 5,887,461
[45] Date of Patent: Mar. 30, 1999

[54] BICYCLE LOCKING DEVICE

[76] Inventor: George A. Heffley, 359 W. Spazier, Burbank, Calif. 91506

[21] Appl. No.: 929,079

[22] Filed: Sep. 15, 1997

[51] Int. Cl.⁶ ..................................................... E05B 71/00
[52] U.S. Cl. .................................. 70/18; 70/232; 70/234; 70/235; 211/5; 211/8; 248/552
[58] Field of Search ............................... 70/DIG. 57, 232, 70/18, 19, 62, 233–236; 224/569, 570; 248/551, 552, 553, 316.5; 211/4, 5, 8

[56] References Cited

U.S. PATENT DOCUMENTS

| | | | |
|---|---|---|---|
| 606,118 | 6/1898 | Bowman . | |
| 607,545 | 7/1898 | Martin | 70/235 |
| 621,072 | 3/1899 | Gregory . | |
| 634,441 | 10/1899 | Capen et al. . | |
| 1,242,848 | 10/1917 | Pale | 70/DIG. 57 X |
| 3,788,109 | 1/1974 | Lane | 70/234 |
| 3,841,119 | 10/1974 | Kaufmann | 70/DIG. 57 X |
| 3,918,279 | 11/1975 | Williamson | 70/234 |
| 3,934,436 | 1/1976 | Candlin et al. | 70/234 |
| 3,964,610 | 6/1976 | Deiner | 211/5 |
| 3,970,196 | 7/1976 | Legge | 211/5 |
| 4,055,973 | 11/1977 | Best | 70/DIG. 57 X |
| 4,126,228 | 11/1978 | Bala et al. | 70/234 X |
| 4,226,399 | 10/1980 | Henderson | 248/553 |
| 5,010,748 | 4/1991 | Derman | 70/DIG. 57 X |
| 5,157,954 | 10/1992 | Pietras | 70/DIG. 57 X |
| 5,323,915 | 6/1994 | Fortune, Sr. et al. | 211/5 |
| 5,351,507 | 10/1994 | Derman | 70/DIG. 57 X |
| 5,447,241 | 9/1995 | Bureau | 211/18 |
| 5,456,443 | 10/1995 | Taaffe | 70/DIG. 57 X |
| 5,699,684 | 12/1997 | Sulin | 70/DIG. 57 X |

*Primary Examiner*—Lloyd A. Gall
*Attorney, Agent, or Firm*—Lewis Anten, Esq.; Amedeo Ferraro, Esq.

[57] ABSTRACT

A bicycle locking device is disclosed having a base that is securely mountable to a surface, such as a wall, a post, or a ceiling and a support arm connected at one end to the base and having a jaw-like fastener at its other end which cooperates with a jaw-like locking arm connected to the support arm for lockable attachment to a bicycle. The bicycle locking device is retractable for easy storage.

11 Claims, 9 Drawing Sheets

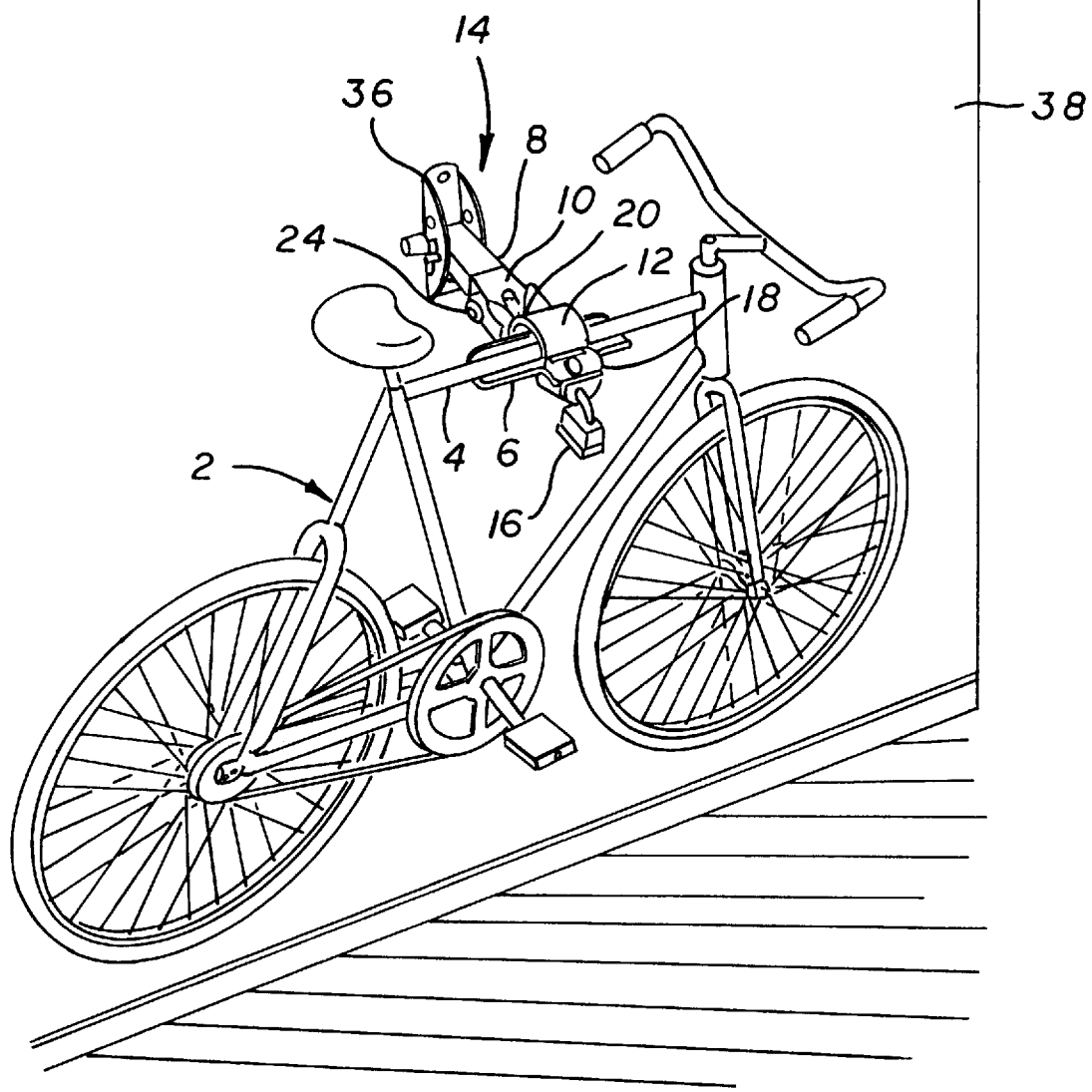

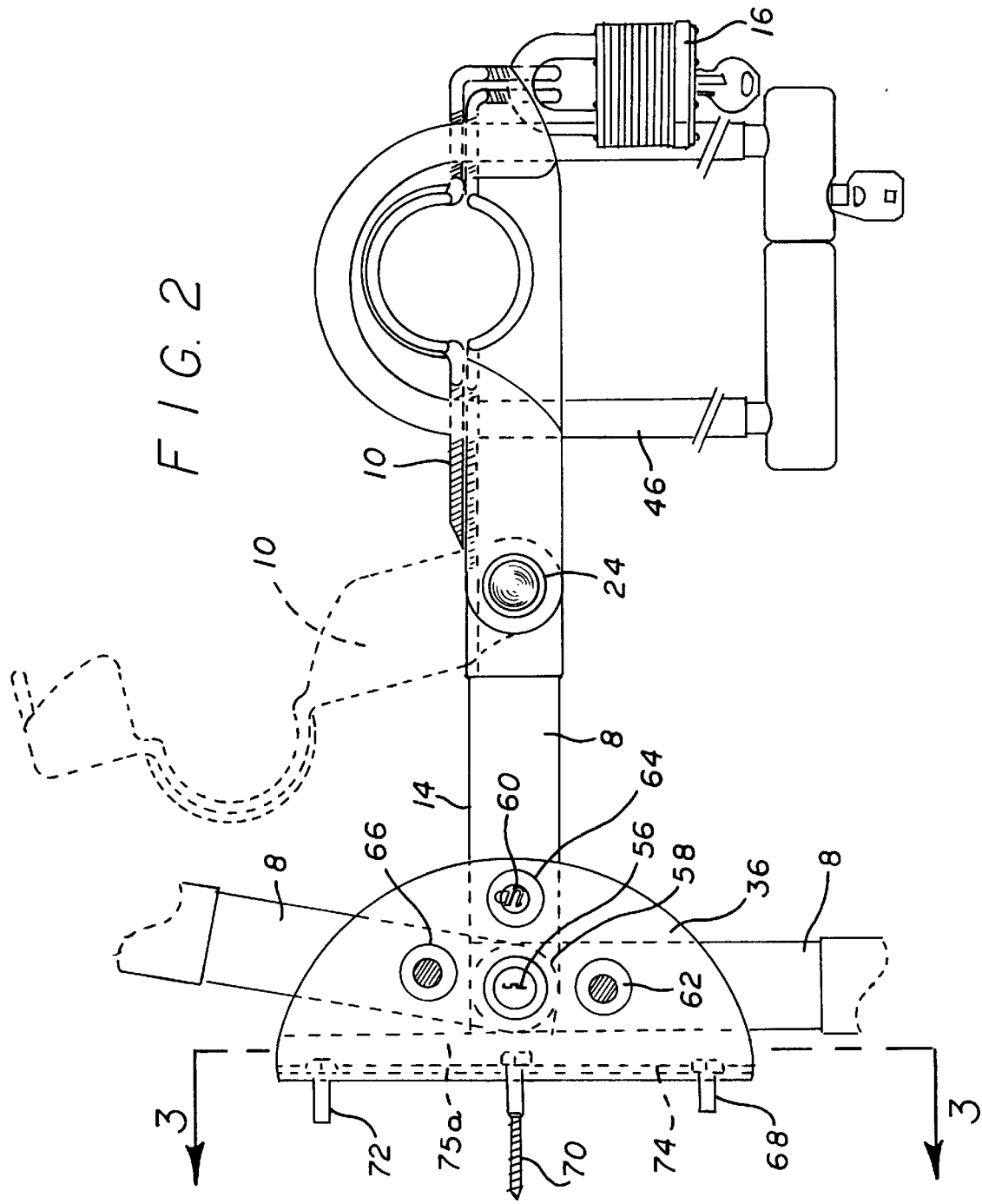

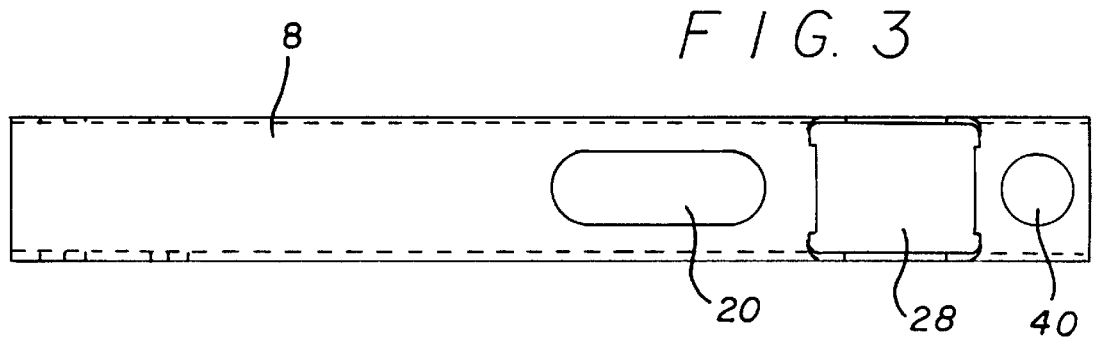
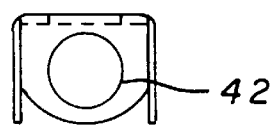
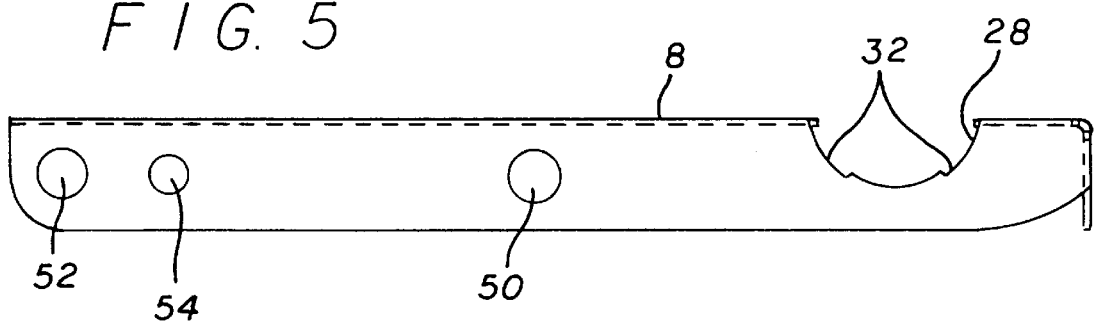
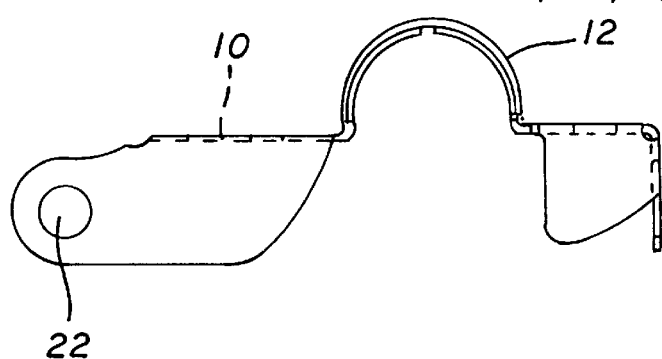

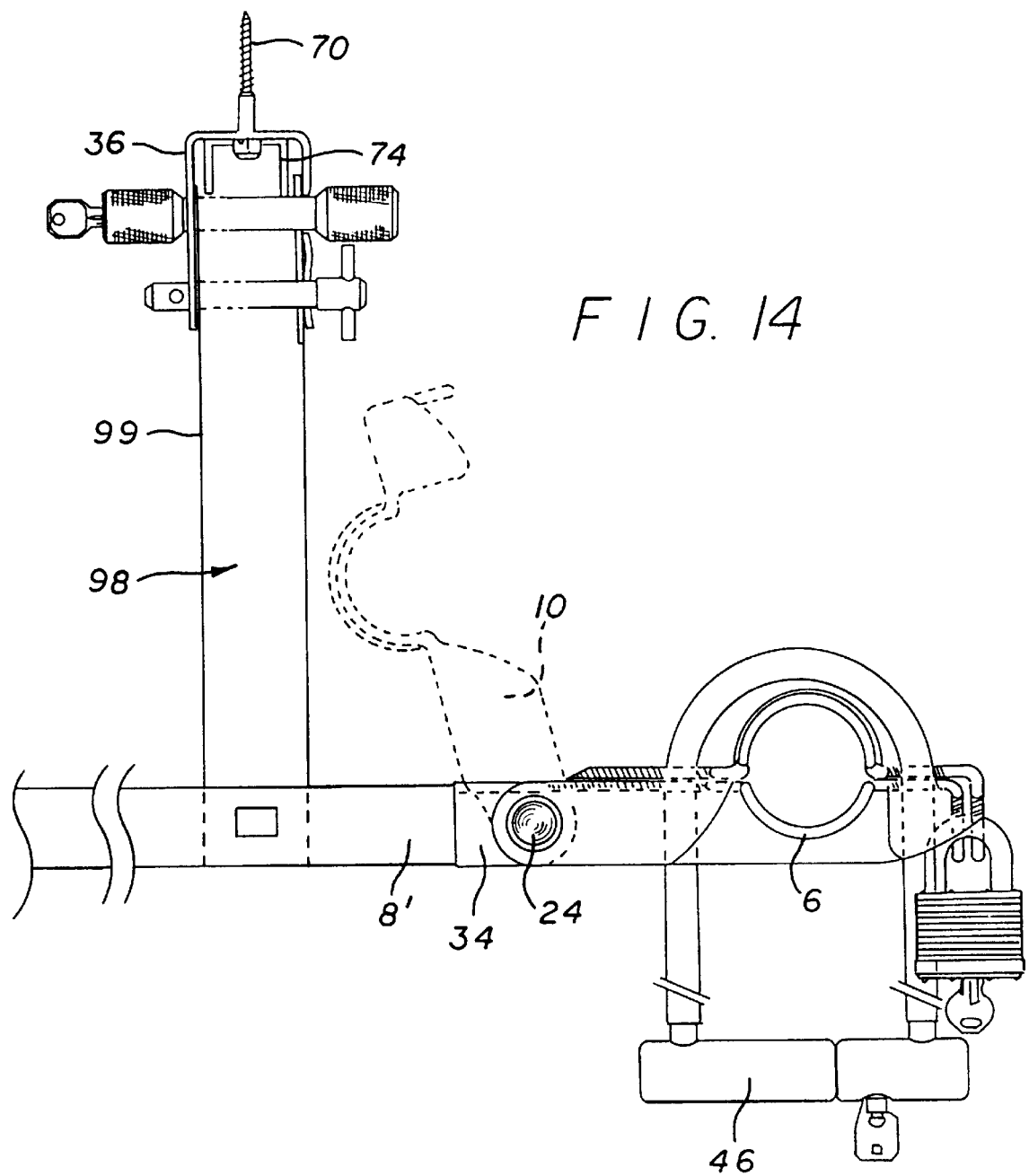

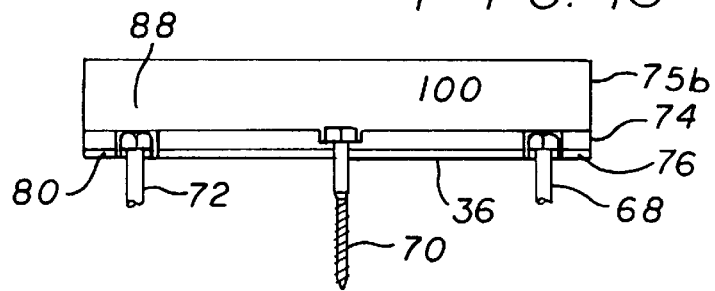
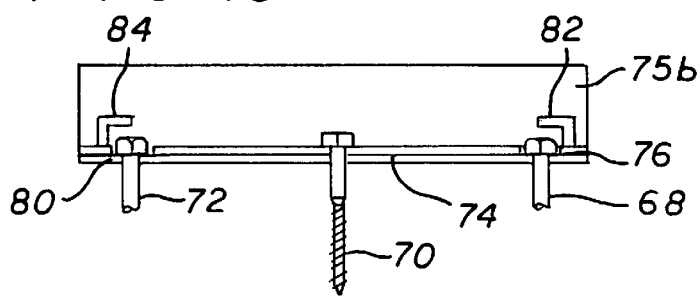
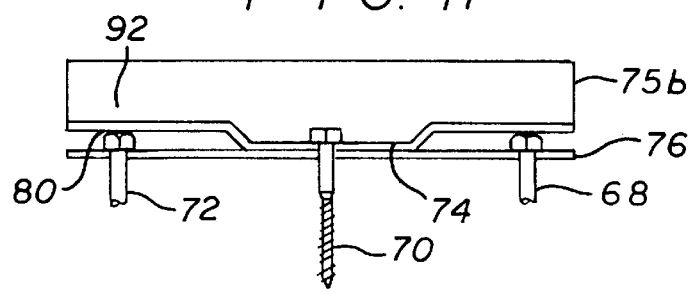
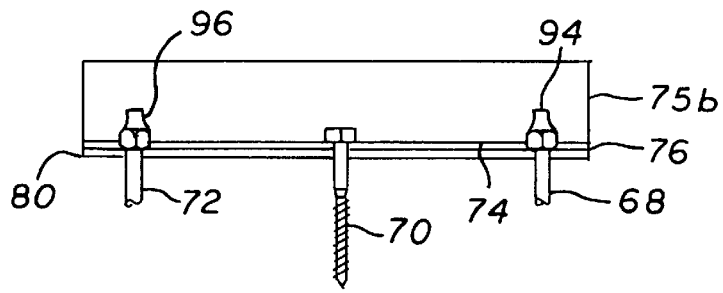

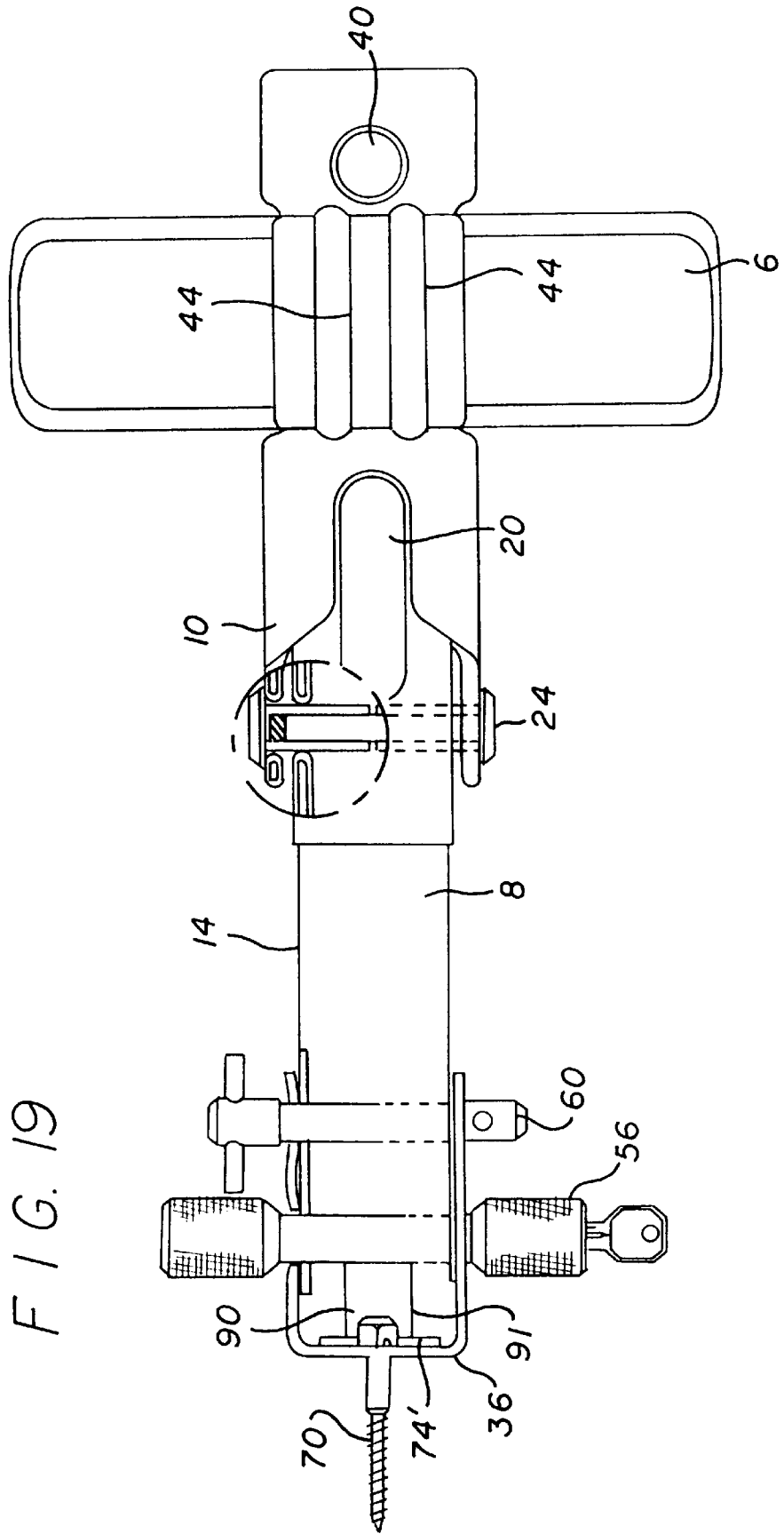

BICYCLE LOCKING DEVICE

BACKGROUND OF THE INVENTION

The present invention relates to devices for supporting and locking bicycles and more particularly to a bicycle locking device for securing and locking a bicycle against unauthorized use and/or for ease of storage.

DESCRIPTION OF THE RELATED ART

In this day and age of traffic congestion, polluted air, and ever increasing health awareness, bicycle riding is becoming very popular due to its health benefits, environmental benefits, light weight, and ease of storage. Therefore, storing securely and efficiently a bicycle in the open or inside a structure is very important for the owner of the bicycle.

A number of devices for securing and locking bicycles are known. Some devices lock a bicycle by grasping onto the handlebar or top tube of the bicycle frame with a pair of arms or jaws that are mounted at one end to a wall or other mounting surface and utilize a padlock at the other end to lock the handlebar or top tube. Such devices, however, are not hardy enough and are not protected against removal from the mounting surface by an unauthorized user equipped with the proper tools resulting in theft of the bicycle and the locking device itself.

Other devices use a stand and cables to lock onto a wheel or other accessible parts of the bicycle. "U"-locks for bicycles are also used to fasten a bicycle wheel to a post or a tree or any other suitable surface.

Using a bicycle wheel for securing a bicycle is not recommended as frequent pushing of any locking device around the wheel may damage the spokes of the wheel which leads to costly repairs. Using parts of a bicycle other than the handlebar or the top tube for securing a bicycle may not be convenient and may present storage problems. In addition, such locking devices are not sturdy, are easy to disassemble, and are easily handled by unauthorized users with appropriate tools resulting in bicycle theft and costly replacement.

Known devices also do not provide for easy storage of a bicycle inside a structure, such as hanging the bicycle from the ceiling out of the way of the owner, and are often capable of damaging the part of the bicycle to which they are fastened.

Therefore, the need arises for a bicycle locking device that is protected from unauthorized dismounting or disassembly and is sturdy enough to discourage unauthorized users from attempting to steal the bicycle and the bicycle locking device itself.

The need also arises for a bicycle locking device that provides for easy storage of the bicycle inside a structure out of the way of the owner and that protects the bicycle part being fastened from damage by the locking device itself.

SUMMARY OF THE PRESENT INVENTION

The present invention is directed to a bicycle locking device that meets the above needs by being sturdy, being easy to store inside a structure in an unobtrusive manner, that is protected from unauthorized dismounting and disassembly, and that protects the part of the bicycle which is used to lock the bicycle. In one embodiment, the bicycle locking device of the present invention comprises a base having at least one aperture for receiving means for fastening the base to a mounting surface, such as a wall; a security cover configured to preclude access to the fastening means when the security cover is associated with the base for preventing unauthorized dismounting of the base from the mounting surface; means for holding the security cover to the base; a bicycle support arm connected at one end to the base; and a bicycle locking arm connected to the bicycle support arm, the bicycle locking arm cooperating with the bicycle support arm in a jaws-like fashion to safely secure and lock a bicycle therebetween.

The bicycle locking device of the present invention may further include a lock for preventing access to and removal of the holding means used to hold the security cover to the base.

BRIEF DESCRIPTION OF THE DRAWINGS

FIG. 1 is perspective view of a bicycle secured and locked by a wall mounted bicycle locking device in accordance with the present invention;

FIG. 2 is a side elevational view of the bicycle locking device of the present invention showing the bicycle support arm extended horizontally away from the base and the bicycle locking arm on top of the support arm in a closed jaws configuration, the open position of the bicycle locking arm shown in hidden line, and a "U"-lock and a padlock locking both arms;

FIG. 3 is a top view of a disassembled portion of the bicycle support arm of the present invention shown with two apertures for receiving a "U" lock;

FIG. 4 is front end view of the bicycle support arm of the present invention showing an aperture for receiving a padlock;

FIG. 5 is a side elevational view of a disassembled portion of the bicycle support arm showing an aperture for pivotal connection to the base, a second aperture for receiving a locking pin, a third aperture for connection to a pivoting bicycle locking arm, and a cutout for receiving a saddle in accordance with the present invention;

FIG. 6 is a side elevational view of the bicycle locking arm of the present invention showing an aperture at one end for pivotal connection the bicycle support arm;

FIG. 14 is a partial side elevational view of an alternative embodiment of the present invention showing a portion of the bicycle locking device adapted for mounting to a ceiling to support and lock two bicycles one on each side of the support mast;

FIG. 15 is a sectional view along partial section line 3—3 of FIG. 2 of an alternative embodiment of the security plate of the present invention with both end fastening bolts being completely covered by the security plate and positioned within two recesses on the bottom of the security plate, and the middle holding bolt head being received completely in an appropriately sized and shaped recession the outer side of the security cover to prevent access to the bolts by an unauthorized user;

FIG. 16 is a sectional view along partial section line 3—3 of FIG. 2 of another alternative embodiment of the security plate of the present invention in which both end mounting bolts are partially covered by tabs protruding from the security plate to prevent unauthorized access to the bolts;

FIG. 17 is a sectional view along partial section line 3—3 of FIG. 2 of another alternative embodiment of the security plate of the present invention in which the security plate is angled to cover both end mounting bolts to prevent unauthorized access to the bolts;

FIG. 18 is a sectional view along partial section line 3—3 of FIG. 2 of the base showing another alternative embodiment of the security plate of the present invention in which both end mounting bolts are below form-pressed protrusions having an upper opening that is narrower than the head of the bolts to prevent access to the bolts by an unauthorized user; and FIG. 19 is a top plan view of an alternative embodiment of the bicycle locking device of the present invention including a lock for preventing access to and removal of the bolt used to hold an alternatively shaped security cover to the base.

DETAILED DESCRIPTION OF THE DRAWINGS

Figure 7:
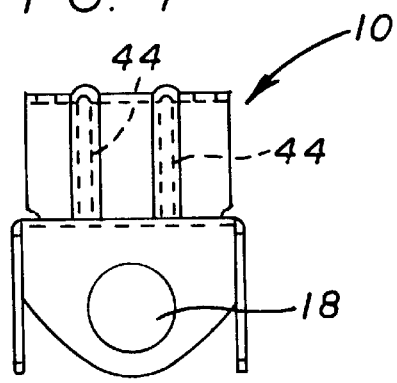
FIG. 7 is a front end view of the bicycle locking arm of the present invention showing an aperture for receiving a padlock.

The following description includes the best mode presently contemplated for carrying out the invention. This description is not to be taken in a limiting sense, but is made merely for the purpose of describing the general principles of the invention. The scope of the invention should be determined with reference to the claims.

Referring to FIG. 1, a bicycle 2 is shown supported and locked via its top tube 4 by a bicycle locking device 14 which is mounted via its base 36 to a mounting surface 38, shown as a wall, in accordance with the present invention. The top tube 4 of the bicycle 2 is held in a jaws-like fashion between a bicycle support arm 8 having a saddle 6 and a bicycle locking arm 10 which cooperates via its concave-shaped portion 12 (see also FIG. 6) with the saddle 6 to hold the top tube 4 and to secure the bicycle in an upright position. The jaw-like arms 8 and 10 are shown in a closed position in FIG. 1 with a conventional padlock 16 at the tip of the jaws. Alternatively, the jaw-like arms 8 and 10 may be secured in a closed position (see FIG. 2) with a conventional "U" lock 46 in place or a cable lock system and the like.

The bicycle locking device 14 is preferably manufactured from base 4130 Chrommolly steel, cold rolled steel, case hardened steel, or any other material suitable for the intended purpose of the inventive device. The preferred materials make for a very sturdy bicycle locking device that is difficult to tamper with by an unauthorized user.

The locking arm 10 and a portion of the support arm 8, including the saddle 6, (see FIGS. 12 and 14) are dipped prior to shipping into a liquid plastic bath, which after hardening or curing, results in a rubber, silicone, or urethane like coating 34 which acts as protective padding, helps resist weather damage and chipping to the arms 8 and 10 and prevents damage to the part of the bicycle that is being fastened by the bicycle locking device 14. Furthermore, when the locking arm 10 is in a raised position and leaning towards the base 36, the coating 34 of the arm 10 protects the mounting surface on which the base 36 is mounted from being scratched, chipped, or otherwise damaged.

Figure 11:
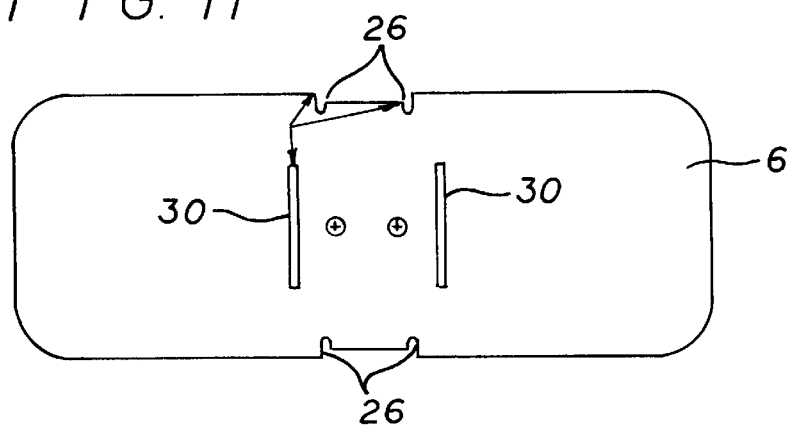
FIG. 11 is a top plan view of the bicycle support arm saddle of the present invention.

The saddle 6 may be manufactured separately to be pressure snap-fitted to the support arm 8 in the concave shaped recess 28 (see FIG. 5). The saddle 6 is mounted via two pairs of indents 26 on each side of the saddle 6 and a pair of slots 30 formed in the mid-portion of the saddle 6 (see FIG. 11) which fit snugly into a corresponding pair of flanges 32 and another pair of flanges on the upper edge of the recess 28, one on each side, (not shown) formed on the concave shaped recess 28 of the support arm 8 (see FIG. 5). The snap-fit assembly securely and permanently locks the saddle 6 into the support arm 8 in a self-locking position and is also quick and easy, thereby, avoiding additional labor-intensive procedures such as welding, gluing, soldering, brazing, or the like.

The locking arm 10 is provided with an aperture 18 at its outer tip (see FIG. 7) for accommodating a conventional padlock and is pivoted via circular aperture 22 (see FIG. 6) and latch pivot pin 24 (see FIG. 1 and FIG. 12) when attached to the support arm 8 which receives the latch pivot pin 24 in circular aperture 50 (see FIG. 5). The latch pivot pin 24 is assembled from two conventional outer press fit pivot pins 24a and 24b (FIG. 12) each having a flange at one end within a partially drilled recess in the center for receiving a conventional hardened steel dowel pin (25) which is resistant to tampering and which press fits within the drilled recesses between the pivot pins 24a and 24b (see FIG. 12). This easy assembly results in a permanent and secure self-locking latch pivot pin 24 which cannot be easily disassembled by an unauthorized user. The locking arm 10 is further provided with a pair of strengthening ribs or raised areas 44 (see FIG. 7) over the concave shaped end 12 of the locking arm 10. The strengthening ribs 44 contribute to the sturdiness of the inventive bicycle locking device 14. The locking arm 10 is also provided with an aperture 48 for receiving a conventional "U" lock.

The locking arm 10 is designed to move up and down on the latch pivot pin 24 from a closed ("down") position (see FIG. 12) engaging the support arm's saddle 6 to secure a bicycle to an open ("up") position (see FIG. 2) where the arm 10 is shown in hidden line.

Figure 8:
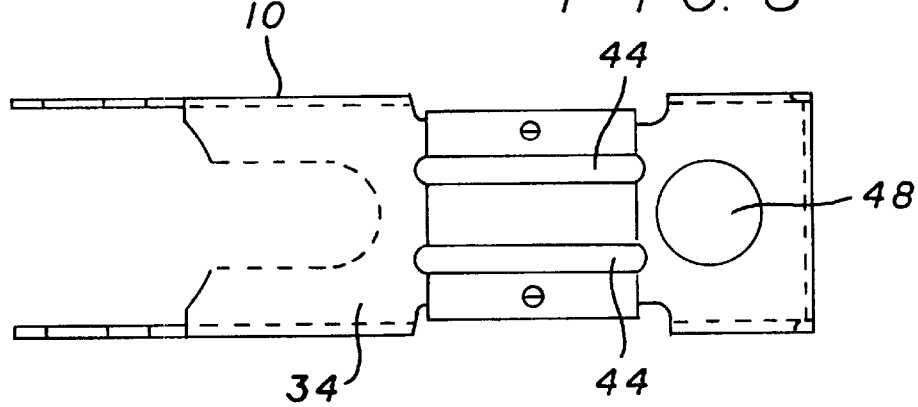
FIG. 8 is a top plan view of the bicycle locking arm of the present invention shown with apertures for receiving a "U" lock.

The support arm 8 is provided with apertures 20 and 40 for receiving a conventional "U" lock 46 (see FIG. 3 and FIG. 14). The support arm 8 is also provided with aperture 42 at its outer tip (see FIG. 4) for receiving a conventional padlock 16 (see FIG. 1). Aperture 42 mates with aperture 18 (see FIG. 7) to accommodate the padlock at the tip of the jaws of arms 8 and 10 if a padlock-type lock is used. Alternatively, apertures 20 and 40 mate with aperture 48 to allow the passage of "U" lock 46 (see FIG. 2). The design of the locking arm 10 allows for the use of a "U" lock to lock the support arm 8 and locking arm 10 with only one aperture 48 (see FIG. 8).

The support arm 8 is further provided with circular apertures 52 and 54 as shown in FIG. 5. Aperture 52 is designed to receive a conventional locking hitch pin 56 which pivots the support arm 8 inside the base 36 via circular base aperture 58 (see FIG. 12, FIG. 9 and FIG. 2). The conventional locking hitch pin 56 is sturdy and may be purchased at U-Haul inventory stores located throughout the country. Locking hitch pins of this type are usually used to hitch trailers. Therefore, tampering with this pivot assembly by an unauthorized user is difficult and unlikely. Apertures 52 and 54 may have raised surfaces around each aperture acting as washers or friction bearing surfaces enabling a better pivotal fit between the support arm 8 and the counterpart base apertures.

The support arm 8 is designed to support a bicycle in three positions—two retracted and one extended. The extended position is in a direction perpendicular to the mounting base 36 (or horizontal if the base is mounted as shown in FIG. 1) whereby the length of the support arm 8 determines how far from the base 36 a bicycle can be secured. The preferred length of the support arm 8 is 13.5 inches measured from the end of the base to the center of saddle 6 and allows for easy storage of the bicycle. It is appreciated that support arms of various lengths may be manufactured depending on the needs of buyers. The retracted positions are "up" and "down" in a direction generally parallel to the mounting surface (see FIG. 2).

When the support arm 8 is in an extended position (FIG. 5), a conventional spring ball pin 60 is positioned (see FIG. 12 and FIG. 2) inside base aperture 64 (see FIG. 9) and into aperture 54 of the support arm 8. The spring ball pin 60 locks the support arm firmly in this position and allows the arm to support a bicycle at the saddle 6. Spring ball pins of this type are commercially available at hardware stores throughout the country.

Figure 9:
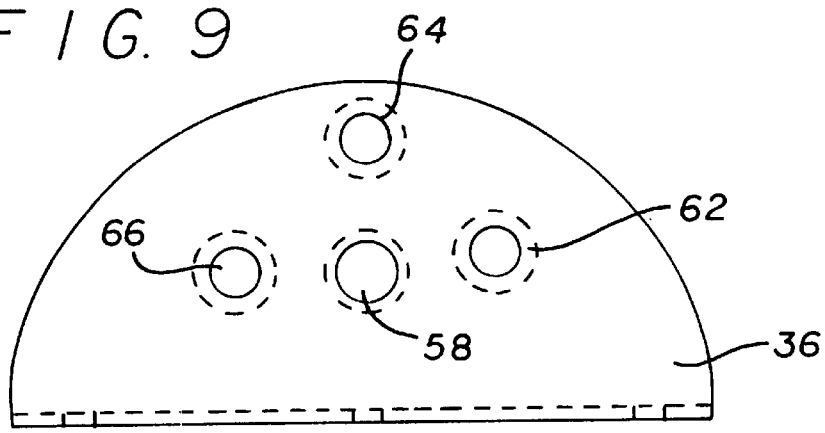
FIG. 9 is a side elevational view of the base of the present invention having sides with circular cutouts for pivotal attachment of the bicycle support arm in various positions.

When the support arm 8 is in a "down" retracted position (see FIG. 2), the spring ball pin 60 supports the support arm through the support arm with a spring ball pin 60 positioned inside circular aperture 54 of arm 8 and inside aperture 62 (see FIG. 9). In this position, the support arm 8 does not support or lock a bicycle and is in a stored position, close to the mounting surface.

When the support arm 8 is in an "up" retracted position (see FIG. 2), the spring ball pin 60 supports the support arm with a spring ball pin 60 positioned inside circular aperture 54 of the arm 8 and inside aperture 66 (see FIG. 9). In this position, the support arm 8 does not support or lock a bicycle and is in a stored position, close to the mounting surface.

Base 36 is mounted to a mounting surface via conventional bolts or screws 68, 70, and 72 (see FIG. 2). The bolts may be wood bolts, lug bolts, wood screws or the like. The bolts may be screwed directly into the mounted surface or may be "through bolts" fastened by nuts behind the mounting surface.

Figure 10:
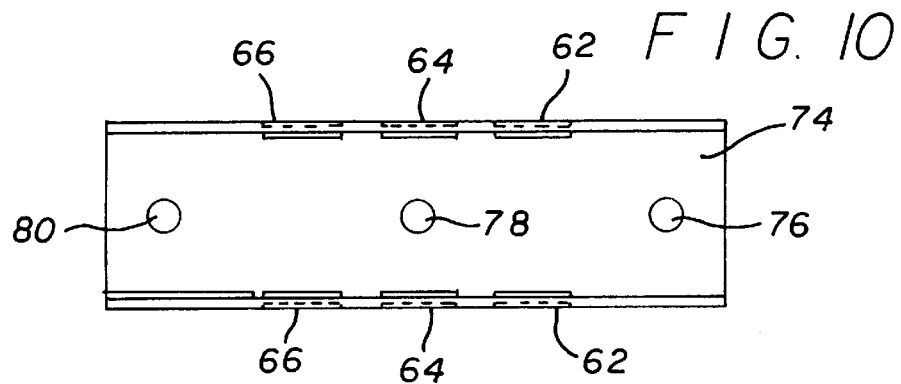
FIG. 10 is a bottom plan view of the base of the present invention having openings for receiving bolts, screws and the like for fastening the base to a mounting surface and for holding the security cover to the base.
Figure 13:
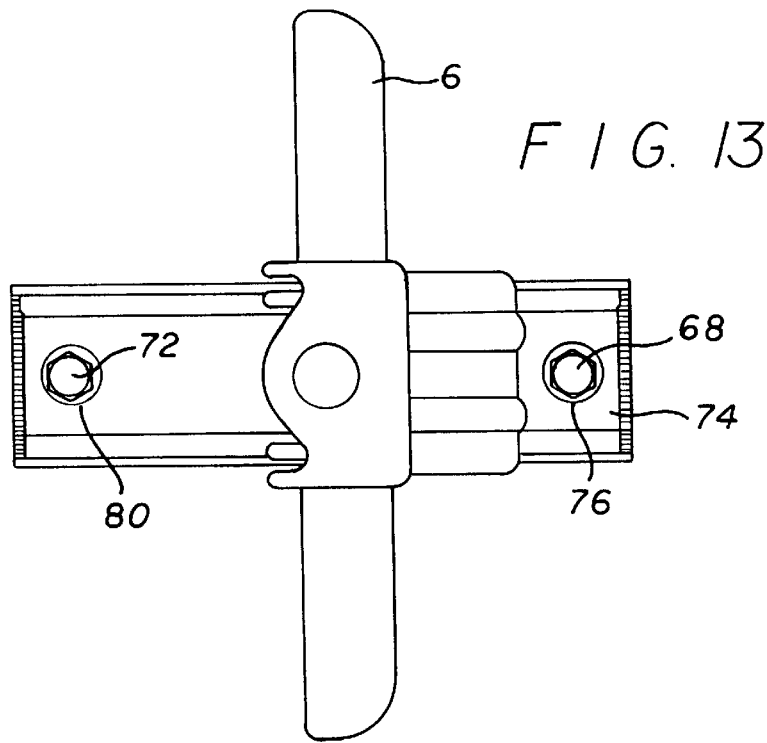
FIG. 13 is a front end view of the bicycle locking device of the present invention mounted to a mounting surface and showing the security plate in a assembled configuration.
Figure 12:
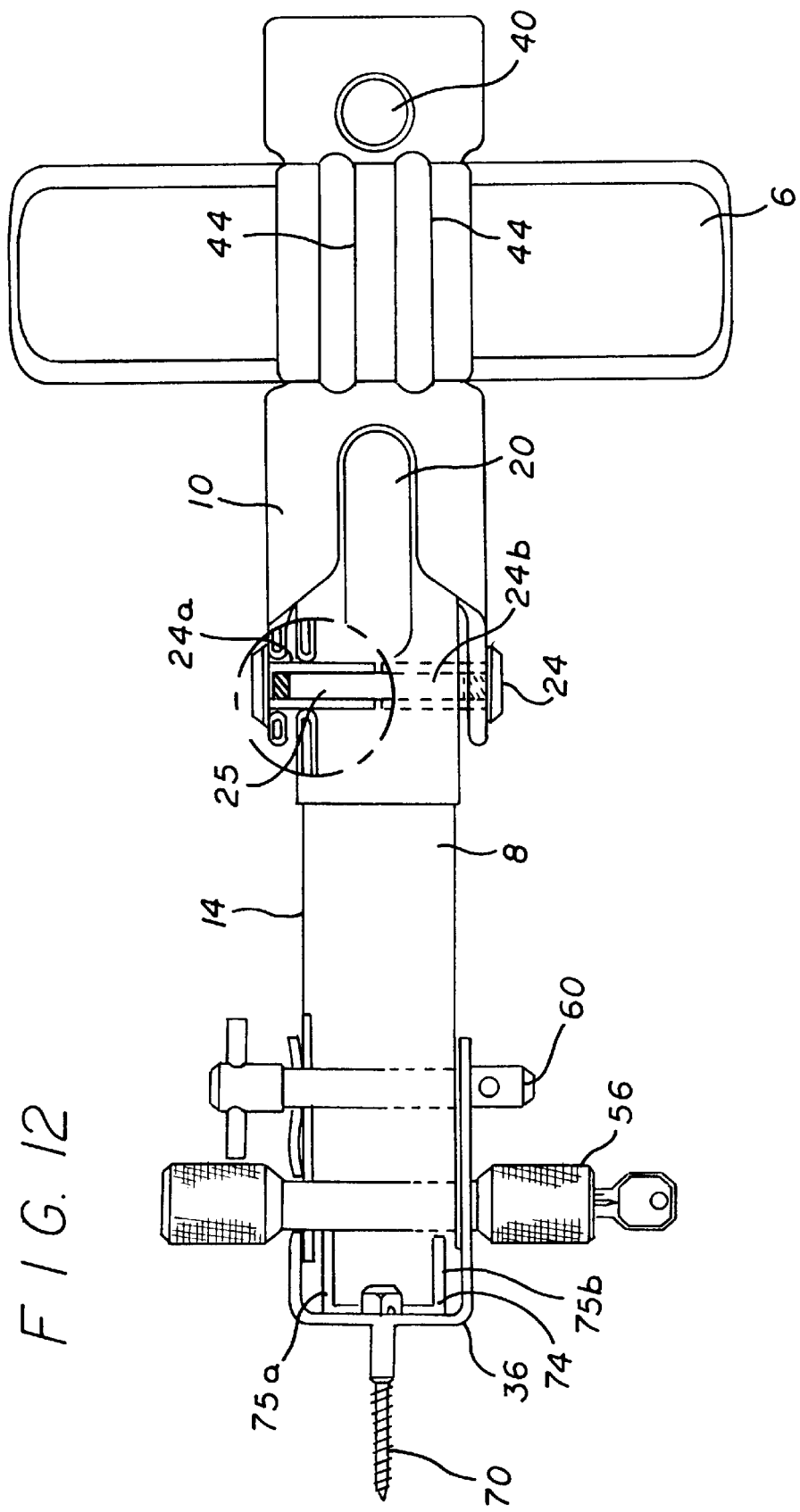
FIG. 12 is a top plan view of the bicycle locking device of the present invention including a lock for preventing access to and removal of the bolt used to hold the security cover to the base.

In a preferred embodiment of the present invention, a security plate 74 having raised side walls 75a and 75b is installed inside the base 36 as shown in FIG. 2 and FIG. 12. The security plate is designed to prevent access to hexagonally shaped head bolts 68, 70 and 72 (see FIG. 2, FIG. 12 and FIG. 13) once installed. The security plate 74 is held against the base 36 with a center bolt 70 which passes through the base and into the mounting surface. The security plate 74 is held between the head of the bolt 70 and the base 36. The security plate 74 is shown also in FIG. 10 having three circular apertures 76, 78, and 80 for receiving bolts or screws 68, 70 and 72. As shown in FIG. 13, the hexagonal shaped heads of bolts 68 and 72 are sunk into and fit inside apertures 76 and 80 of the security plate 74 (see FIG. 2) whose thickness is designed to receive and surround at least partially the heads of bolts 68 and 72 so as to prevent access to these bolts by an unauthorized user equipped with a wrench or similar tool for accessing bolts, once the security plate 74 and base 36 assembly is mounted permanently to a surface. The head of bolt 70 remains on top of security plate 74 as shown in FIG. 2 to effect permanent mounting of the security plate 74 and base 36 to the mounting surface. The head of bolt 70 thus mounted is not accessible by an unauthorized user due to the shape of the security plate whose side walls 75a and 75b rise to a level almost tangent to aperture 58 (FIG. 2) below an installed locking hitch pin 56, which is intended to be installed after the base 36 and security plate 74 are permanently mounted to a mounting surface, as shown in FIG. 12. The side walls 75a and 75b are close to the locking hitch pin 56 so as to prevent the plate 74 from being raised above the base 36. The bicycle locking device can thus be securely and permanently mounted to a wall, ceiling, or any other suitable mounting surface.

In another embodiment of the present invention, an alternative flat security plate 74' is used as shown in FIG. 19. The base 36 is to be secured by bolts 68 and 72 (not shown in FIG. 19). To prevent access to bolt 70, a locking block 90 (see FIG. 19) is positioned between the locking hitch pin 56 and the security plate 74. The locking block 90 is provided with a concave shaped groove on one end designed to accommodate the head of bolt or screw 70 and is thus held firmly between the locking hitch pin 56 and the security plate 74 once the locking device is assembled and permanently installed making it tamper resistant.

In an alternative embodiment of the present invention, security plate 74 is assembled inside base 36 using bolts or screws 68, 70 and 72 as shown in FIG. 16. In this embodiment, the heads of bolts or screws 68 and 72 are fitted inside apertures 76 and 80, respectively, and covered partially by tabs 82 and 84, respectively, on the outside of security plate 74 which are designed to receive and cover partially the heads of bolts or screws 68 and 72 so as to prevent access to these bolts or screws by an unauthorized user equipped with a wrench, screwdriver or the like, once the security plate and base assembly is mounted permanently to a surface. The head of bolt 70 remains on top of security plate 74 as shown in FIG. 2 to effect permanent mounting of the security plate and base to the mounting surface. The head of bolt 70 thus mounted is not accessible by an unauthorized user due to the U-shape of the security plate whose outer wings 75 rise to a level almost tangent to aperture 58 (FIG. 2) and thus parallel to an installed locking hitch pin 56, which is intended to be installed after the base 36 and security plate 74 are permanently mounted to a mounting surface, as shown in FIG. 12. The bicycle locking device can thus be securely and permanently mounted to a wall, ceiling, or any other suitable mounting surface.

In another alternative embodiment of the present invention, security plate 74 is assembled inside base 36 using bolts or screws 68, 70 and 72 as shown in FIG. 15. In this embodiment, the security plate 74 is of sufficient thickness to accommodate the heads of bolts or screws 68 and 72 inside apertures 76 and 80, respectively, formed on the underside of the security plate 74. In this manner, the heads of bolts or screws 68 and 72 are covered completely by the security plate 74 so as to prevent access to these bolts or screws by an unauthorized user equipped with a wrench, screwdriver or the like, once the security plate and base assembly is mounted permanently to a mounting surface. The head of bolt 70 remains on top of security plate 74 by being received in a recess 100 as shown in FIG. 15 to effect permanent mounting of the security plate and base to the mounting surface. The head of bolt 70 thus mounted is not accessible by an unauthorized user due to the raised side walls 75a and 75b of the security plate which rise to a level almost tangent to aperture 58 (FIG. 2) and thus parallel to an installed locking hitch pin 56, which is intended to be installed after the base 36 and security plate 74 are permanently mounted to a mounting surface, as shown in FIG. 12. The bicycle locking device can thus be securely and permanently mounted to a wall, ceiling, or any other suitable mounting surface.

In yet another alternative embodiment of the present invention, security plate 74 is assembled to base 36 using bolts or screws 68, 70 and 72 as shown in FIG. 17. In this embodiment, the security plate 74 has an offset bottom surface on each end such that the heads of bolts or screws 68 and 72 are covered completely by the bottom surface of the security plate 74 on each end so as to prevent access to these bolts or screws by an unauthorized user equipped with a wrench, screwdriver or the like, once the security plate and base assembly is mounted permanently to a surface. The head of bolt 70 remains on top of security plate 74 as shown in FIG. 17 to effect permanent mounting of the security plate and base to the mounting surface. The head of bolt 70 thus mounted is not accessible by an unauthorized user due to the shape of the security plate whose raised walls 75a and 75b rise to a level almost tangent to aperture 58 (FIG. 2) and below the installed locking hitch pin 56, which is intended to be installed after the base 36 and security plate 74 are permanently mounted to a mounting surface, as shown in FIG. 12. The bicycle locking device can thus be securely and permanently mounted to a wall, ceiling, or any other suitable mounting surface.

In still another alternative embodiment of the present invention, security plate 74 is assembled to base 36 using bolts or screws 68, 70 and 72 as shown in FIG. 18. In this embodiment, the heads of bolts or screws 68 and 72 are fitted inside apertures 76 and 80 respectively and covered completely by form pressed protrusions 94 and 96, which are narrower and open at the top, and designed to receive and cover completely the heads of bolts or screws 68 and 72 so as to prevent access to these bolts or screws by an unauthorized user equipped with a wrench, screwdriver or the like, once the security plate and base assembly is mounted permanently to a surface. The head of bolt 70 remains on top of security plate 74 as shown in FIG. 2 to effect permanent mounting of the security plate and base to the mounting surface. The head of bolt 70 thus mounted is not accessible by an unauthorized user due to the shape of the security plate whose raised side walls 75a and 75b rise to a level almost tangent to aperture 58 (FIG. 2) and thus parallel to an installed locking hitch pin 56, which is intended to be installed after the base 36 and security plate 74 are permanently mounted to a mounting surface, as shown in FIG. 12. The bicycle locking device can thus be securely and permanently mounted to a wall, ceiling, or any other suitable mounting surface.

The base 36, security plate 74, and support arm 8 are preferably powder coated, painted, or chrome plated for weather protection. Other coatings may be used as long as they serve the intended purpose of the inventive bicycle locking device.

An alternative embodiment of a bicycle locking device 98, as shown in FIG. 14, is adapted to secure two bicycles, one on each side of the support mast 99, and has one end that engages the base 36 in the same manner as the support arm 8 as described above, to form a "T" with double-ended support arm 8'. The double-ended support arm 8' has a saddle 6 and locking arm 10 on each of its ends. The ends of the support arm 8' may be identical to the locking arm 10 and saddle 6 shown in FIG. 14 or may be configured to support more than one bicycle on each side of the mast 99 as may be desirable for a bicycle store displaying bicycles hanging from the ceiling. Such a configuration could have multiple saddles 6 and corresponding multiple concave-shaped portions on each end of the double-ended support arm 8'. It will be appreciated that the open position of locking arm 10 on each side is leaning towards the base and thus conveniently out of the way for the owner of the bicycles providing for easy storage of two bicycles. It will be further appreciated that the locking device shown in FIG. 14 may be adapted in a similar fashion to accommodate more than two bicycles.

While the invention herein has been described by means of specific embodiments, numerous modifications and variations could be made thereto by those skilled in the art without departing from the scope of the invention set forth in the claims.

What is claimed is:

1. A bicycle locking device comprising:

a base having at least one aperture for receiving at least one fastener for fastening said base to a mounting surface;

a security cover configured to preclude access to said fastener when said security cover is associated with said base for preventing unauthorized dismounting of said base from the mounting surface;

a holder for holding said security cover to said base;

a bicycle support arm pivotally connected at a first end to said base and being lockable in a fixed position relative to said base, said bicycle support arm having a second end configured to hold and support a portion of a bicycle frame tubing; and a bicycle locking arm having a first end pivotally connected to said bicycle support arm and a second end configured to hold a portion of a bicycle frame tubing, said bicycle locking arm cooperating with said bicycle support arm whereby said locking arm moves relative to said support arm in a jaws-like fashion to hold a portion of a bicycle frame tubing therebetween.

2. The bicycle locking device of claim 1 further comprising means for preventing access to said holder.

3. The bicycle locking device of claim 1 wherein said second end of said bicycle support arm includes a saddle for holding and supporting a portion of a bicycle frame tubing.

4. The bicycle locking device of claim 1 further comprising a locking pivotable connector for pivotally connecting said bicycle support arm to said base.

5. The bicycle locking device of claim 3 wherein said second end of said locking arm has a concave-shaped portion for mating with said saddle to secure a portion of a bicycle frame tubing therebetween.

6. The bicycle locking device of claim 5 further comprising a lock for locking together said saddle and said concave-shaped portion of said bicycle locking arm.

7. The bicycle locking device of claim 1 wherein said locking arm is connected to said support arm at a point away from the end of said support arm connected to said base.

8. The bicycle locking device of claim 1 wherein said base has side walls for preventing access to said fastener when said bicycle support arm is connected to said base.

9. The bicycle locking device of claim 1 wherein said security cover is a plate configured to cover said at least one fastener fastening said base to a mounting surface.

10. The bicycle locking device of claim 9 wherein said security cover further comprises upstanding side walls.

11. The bicycle locking device of claim 4 wherein said locking pivotable connector is a locking hitch pin.

* * * * *